United States Patent
Gass et al.

(10) Patent No.: US 6,943,543 B2
(45) Date of Patent: Sep. 13, 2005

(54) INDUCTIVE DISPLACEMENT SENSOR WITH A MEASURING HEAD COMPRISING A PASSIVE RESONANT CIRCUIT

(75) Inventors: Ernst Gass, Stuttgart (DE); Såndor Pali, Veszprém (HU); Årpad Melles, Veszprém (HU)

(73) Assignee: Balluff GmbH (DE)

( * ) Notice: Subject to any disclaimer, the term of this patent is extended or adjusted under 35 U.S.C. 154(b) by 246 days.

(21) Appl. No.: 10/427,520

(22) Filed: May 1, 2003

(65) Prior Publication Data

US 2003/0206007 A1 Nov. 6, 2003

(30) Foreign Application Priority Data

May 2, 2002 (DE) ......................................... 102 19 678

(51) Int. Cl.[7] ................................................. G01B 7/12
(52) U.S. Cl. ........................... 324/207.17; 324/207.18; 324/207.24; 324/207.25
(58) Field of Search ....................... 324/207.11, 207.15, 324/207.16, 207.17, 207.22, 207.24, 207.25; 336/45, 20, 225, 232, 233

(56) References Cited

U.S. PATENT DOCUMENTS 5,939,879 A * 8/1999 Wingate et al. ......... 324/207.17
6,504,361 B1 * 1/2003 Gleixner ................ 324/207.17

FOREIGN PATENT DOCUMENTS

| DE | 100 16 540 | 7/2001 |
|----|------------|--------|
| FR | 26 82 760  | 4/1993 |

* cited by examiner

*Primary Examiner*—Bot Ledynh
*Assistant Examiner*—Reena Aurora
(74) *Attorney, Agent, or Firm*—Ostrolenk, Faber, Gerb & Soffen, LLP; Klaus P. Stoffel

(57) ABSTRACT

An inductive displacement sensor having a displaceable or rotatable, magnetically permeable measuring head, at least one measuring loop whose geometric shape varies in response to the longitudinal/rotary displacement of the measuring head, and at least one excitation loop by which a magnetic flux can be generated in the measuring head. The flux penetrates the at least one measuring loop at any point of the longitudinal/rotary displacement, essentially in the region of the measuring head, and inducing an electric measuring signal (i2). A resonant circuit, which is electrically decoupled from the outside, is arranged on the measuring head and is excited in correct phase relation by a short voltage pulse after a number of, preferably, 10 to 20 free oscillations.

16 Claims, 5 Drawing Sheets

INDUCTIVE DISPLACEMENT SENSOR WITH A MEASURING HEAD COMPRISING A PASSIVE RESONANT CIRCUIT

BACKGROUND OF THE INVENTION

The present invention relates to an inductive displacement sensor.

An inductive displacement sensor of the before-mentioned kind has been disclosed, for example, in DE 100 16 540 C1 and FR 2 682 760 A1. The disclosed displacement sensor comprises an electrically insulated rectangular substrate with an inductor arranged thereon, which can be displaced along the substrate, which embraces the substrate in the form of a U and which serves as a displacement measuring head.

The measuring head consists of a ferromagnetic material. An excitation loop of rectangular shape and a measuring loop of V-shape are provided on the substrate. When an alternating voltage is applied to the excitation loop, it induces, according to Faraday's Law, an alternating voltage in the measuring loop across the magnetic circuit forming in the measuring head and across air. Due to the geometric shape of the measuring loop, which varies continuously along the displacement path of the measuring head, and due to the shape of the excitation loop, that does not change over the displacement path, the output signal of the measuring loop likewise varies continuously as the measuring head is displaced along the substrate.

DE 39 13 861 A1 describes a similar displacement sensor, but with a measuring head that comprises an electrically active (inductive) element which is part of a resonant circuit that can be excited from the outside. Preferably, the inductive element consists of a core coil with a magnetically soft core of substantially E-shaped configuration. The center limb of that core coil is arranged to extend above the measuring and reference loop.

In addition to the measuring loop, the displacement sensor described in DE 39 13 861 A1 comprises a reference loop of, preferably, rectangular shape which serves to observe a control voltage of a resonant circuit that can be acquired from the variations in flux density occurring, for example, as a result of voltage variations of the alternating voltage source or variations in ambient temperature. This permits the flux density of the magnetic field produced by the inductive element to be kept at a constant level. The inductive element induces a measuring voltage in the measuring loop and a reference voltage in the reference loop. For keeping the reference voltage at a constant level, the alternating voltage exciting the resonant circuit can be adjusted to a predetermined threshold voltage by means of a P or a PI controller, depending on the reference voltage.

A displacement sensor comprising a reference loop of the before-mentioned kind is disclosed also in unpublished German Patent Applications Nos. 101 20 822.7 and 100 16 540.0. In the case of those arrangements, both the measuring loop and the reference loop are used as evaluating loops, the measuring signal being derived as the quotient of measuring voltage and reference voltage. By forming the quotient it is possible, especially, to arithmetically eliminate any temperature drifts and positional variations of the measuring head.

In most of the cases, the before-mentioned measuring head is connected to an external evaluation circuit via a conductor, or without a conductor, for example by optical means or a radio link. The evaluation circuit serves for computing the respective displacement distance of the inductor on the substrate as a function of the measuring voltage determined and, if desired, in addition to the before-mentioned correction by means of the reference loop.

It should be noted in this connection that the reference loop and the measuring loop can be arranged on substrates of any desired shape, or even without a substrate, as long as no-contact sampling by the measuring head remains possible. Preferably, a printed circuit board is used as a substrate.

Now, it is a disadvantage of the displacement sensor described in DE 39 13 861 A1 and DE 100 16 540.0 that the measuring head is of the active type so that, consequently, it requires a permanent energy supply which can be realized only by lines that move together with the head.

The measuring arrangement described in FR 2 682 760 A1 is connected with the disadvantage that temperature influences and positional variations of the displacement sensor may lead to unstable measured values. In addition, a relatively high operating power is rendered necessary by the permanent excitation required if useful signals are to be obtained.

In addition, the displacement sensors known from the prior art are, on principle, connected with the problem known as the "air coupling" phenomenon. The air coupling phenomenon is due to electric coupling, according to Faraday's Law, between the excitation loop and the measuring loop(s) outside the active region of the magnetizable core of the measuring head.

SUMMARY OF THE INVENTION

Now, it is the object of the present invention to improve a displacement sensor of the before-mentioned kind so that the disadvantages discussed above, especially the before-mentioned air coupling effects, can be avoided as efficiently as possible and with the best possible cost-benefit ratio.

The displacement sensor distinguishes itself by the fact that a passive oscillating circuit (resonant circuit) is arranged on the measuring head, which circuit is not connected with the outside by an electric conductor and in which, therefore, electric oscillations can be excited only from the outside, i.e. in the present case causally by inductive coupling in the area of the measuring head. According to the invention, the resonant circuit is excited in correct phase relation by a short voltage pulse after a number of free oscillations. The number of free oscillations is, preferably, 10 to 20.

It is the advantage of that arrangement that the displacement sensor can be operated in an energy-saving fashion. In addition, immediate evaluation of the measuring signal is rendered possible after the first half-wave.

Further, the oscillating frequency can be lower by approximately two powers of ten, compared with the 5 to 10 MHz customary in the prior art, which means that it is equal to approximately 100 kHz. This considerably facilitates evaluation or processing of the measuring signal.

Excitation of the resonant circuit is, preferably, effected by a rectangular excitation loop, i.e., as mentioned before, by a voltage pulse shorter than one half-wave of the respective resonant frequency of the resonant circuit. The voltage pulse excites the resonant circuit of the measuring head via the, preferably, U-shaped ferrite. At the same time it induces, due to the air coupling effect, a position-independent voltage in the measuring loops. In order to avoid the influence of the air coupling effect one does not evaluate the measuring signals during the excitation pulse so that one can be sure that the interfering effects resulting from air coupled induction have definitely died down. Only after the excitation pulse has died down will the voltage induced in the measuring loops be evaluated. This induced voltage is, therefore, based on the induction produced by the resonant circuit free from any air coupling effects.

Evaluation of the measuring signal is effected by in-phase rectification of the first few, preferably the second to eighth, amplitudes of oscillation. This is achieved by integrating the amplitudes of oscillation and storing them temporarily in a sample&hold circuit. Thereafter, one measuring cycle is terminated, and the resonant circuit is re-excited in correct phase relation, for example at the moment of the tenth pulse. The measured value is, thus, updated at a frequency of 5 to 10 kHz.

In the case of the measuring head that embraces the substrate in U shape, the passive resonant circuit is, preferably, formed by at least one conductor loop arranged on each side of the substrate, which arrangement guarantees that with loop arranged on both sides of the substrate the coupling effect between the resonant circuit and those loops will be maximized. According to one embodiment of the invention, the resonant circuit comprises at least two conductor loops on each side of the substrate.

The proposed measuring arrangement provides the further advantages that arranging a reference loop on the substrate for the purpose described above is no longer necessary. Contrary to the oscillating frequency of 5 to 10 MHz customary in the prior art, it is now possible to select a lower oscillating frequency of, for example, 100 kHz for the excitation voltage. This considerably simplifies evaluation of the measuring signal, from a technical standpoint.

It should be noted that, on principle, the displacement sensor according to the invention can be employed with the same advantages in measuring arrangements with or without a reference loop and also in measuring arrangements where coupling is effected capacitively instead of inductively.

The displacement sensor according to the invention is operated by an external control and evaluation circuit comprising switching elements by means of which, preferably, the first 5 to 10 half-waves of identical polarity are supplied to an integrator via a phase-controlled switch, and the signals, having been integrated in that way, are stored in a sample&hold circuit. The advantage of this circuit arrangement lies in the fact that the rectification process gives rise to little or even no temperature sensitivity and that relatively high signal amplitudes are obtained at the output of the integrator. Further, the updating frequency of the output value of the entire circuit arrangement is in the range of approximately 5 kHz.

According to another embodiment of the displacement sensor, two V-shaped measuring loops, provided in mirror-symmetrical arrangement, are preferably arranged on both sides of the substrate. This provides the possibility to use the sum voltage of the two V-shaped measuring loops, provided in inverse-parallel arrangement on both sides of the substrate, as a reference and to keep it permanently constant with the aid of a regulating circuit. The differential voltage then represents the position-dependent measured value.

As a result of this feature, almost full compensation of the temperature sensitivity of the evaluation electronics, especially the rectifiers and the integrator, is achieved. In addition, any mechanical variation of the transducers, for example the printed circuit and/or the ferrite, will be effectively compensated.

Further, the influence of any changes in distance between measuring head and printed circuit, in vertical and horizontal direction, is considerable reduced. And linearity, especially at the terminal points of the substrate, is likewise decisively improved by the before-mentioned compensation of marginal effects.

The invention will be described hereafter by reference to the drawing and certain embodiments from which further features and advantages of the invention can be derived.

BRIEF DESCRIPTION OF THE DRAWING(S)

DETAILED DESCRIPTION OF PREFERRED EMBODIMENTS

Figure 1:
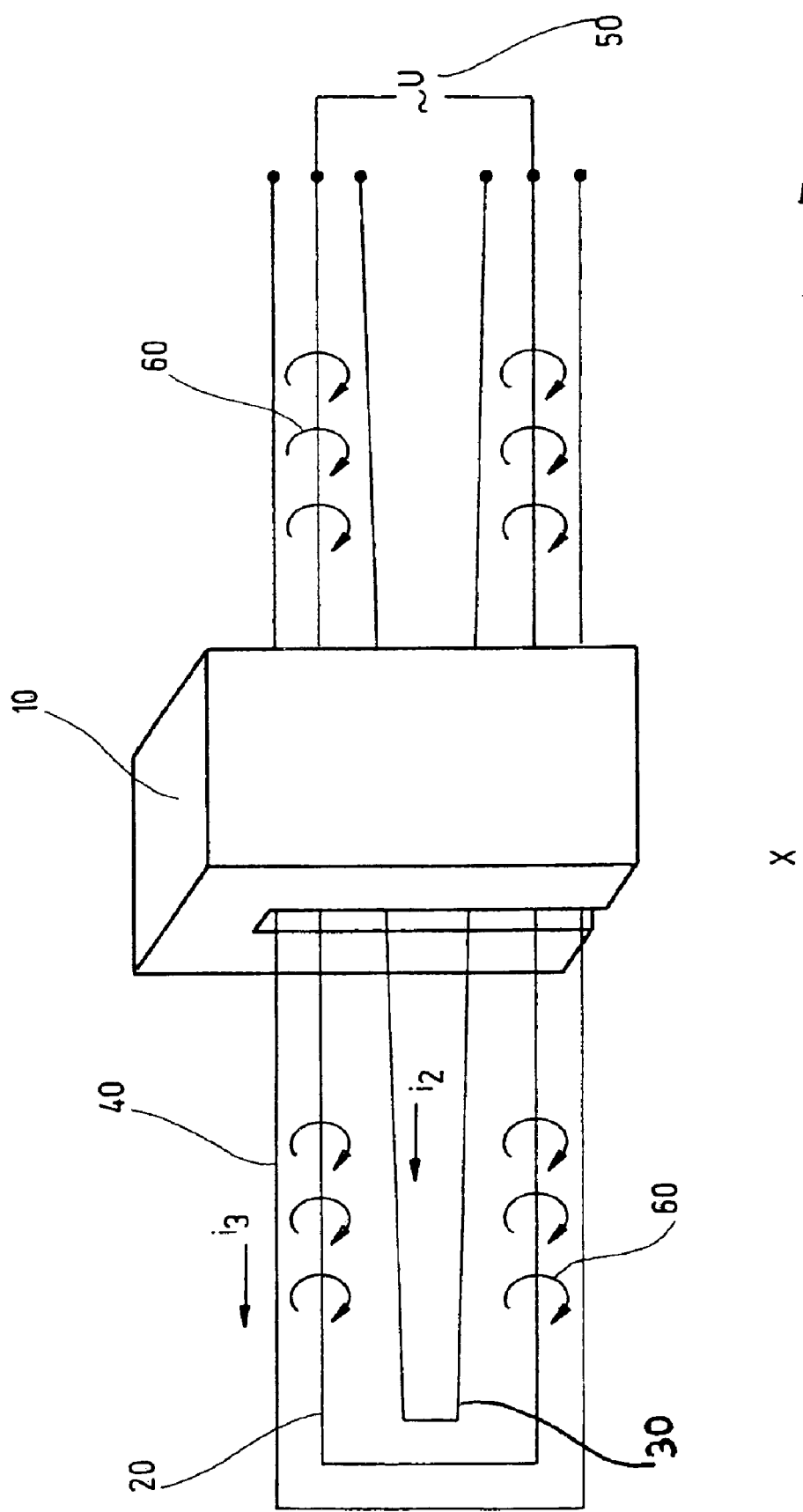
FIG. 1 shows a diagrammatic representation of an inductive displacement sensor according to the prior art.

The displacement sensor shown in FIG. 1 comprises a measuring head 10 (position transducer) which can be displaced, in the indicated x direction, along an arrangement of conductor loops, namely an excitation loop 20, a measuring loop 30 and a reference loop 40. It should be noted in this connection that the measuring head 10, which is adapted to be linearly displaced, is to be regarded only as one possible example and that, on principle, any displacement curve is possible, including for example a circular or elliptical displacement curve.

The measuring head 10 consists of a magnetically permeable material, in the present case of ferrite (ferrite core), although it may also be made from a ferromagnetic or ferrimagnetic material. When an electric alternating voltage 50 is applied to the excitation loop 20, a magnetic field, indicated by magnetic lines of force 60, forms whose flux lines penetrate the inner region of the excitation loop 20 and the inner regions of the measuring loop 30 and the reference loop 40, and will be bundled or concentrated in the known way in the region of the ferrite core 10, due to the magnetizability of the ferrite material. The magnetic circuits forming in the region of the ferrite core 10, therefore, penetrate the measuring loop 30 and the reference loop 40 more strongly in that region. Given the fact that the measuring head 10 has a passive function only, it can be described as a "passive measuring head".

Contrary to the reference loop 40, the measuring loop 30 follows a triangular course along the measuring distance x. Consequently, the portion of the magnetic lines of force that penetrate the measuring loop 30 at the level of the ferrite core 10 varies in approximately linear relation to the measuring distance x, whereas in the case of the reference loop 40 the same portion is approximately constant over the measuring distance x.

It is, thus, possible, after prior calibration, to calculate the position x based on the linear deviation of the measuring current induced in the measuring loop 30. By forming the quotient of the measuring current i2 determined in the measuring loop 30 and the reference current i3 determined in the reference loop 40, it is thus possible, in the way known from the cited prior art, to largely eliminate any interfering influences that may occur simultaneous in the measuring loop 30 and the reference loop 40.

Figure 2:
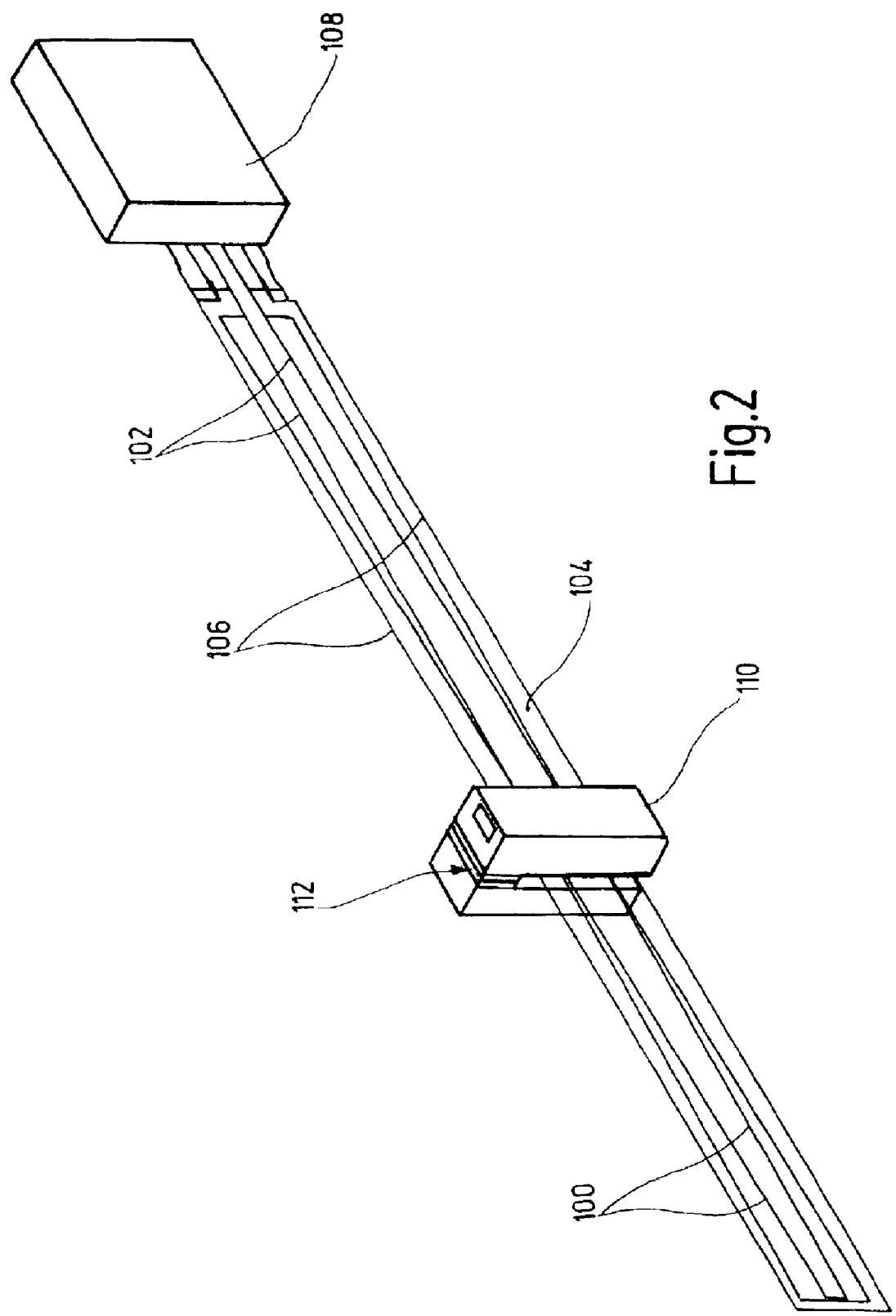
FIG. 2 shows a perspective view of a preferred embodiment of the displacement sensor according to the invention.

FIG. 2 shows a preferred embodiment of the displacement sensor according to the invention. The displacement sensor comprises a carrier substrate 104 on which two oppositely arranged V-shaped measuring loops 100, 102 and one rectangular excitation loop 106 are applied. The conductor loops 100, 102 and 106 are operated by an electronic circuit, which is arranged in a housing 108 and which will be described hereafter in more detail by reference to FIG. 3. According to the invention, a measuring head 110, adapted to be displaced along the carrier substrate 104, comprises a coil/capacitor arrangement connected to form a resonant circuit 112.

It should be noted that the illustrated arrangement of the rectangular excitation loop 106 and the two oppositely directed V-shaped measuring loops 100, 102 on one side represents only one of the possible embodiments and that the preferred embodiment comprises a double-sided rectangular excitation loop 102 and V-shaped measuring loops 100, 102 provided in inverse-parallel arrangement on both sides. That arrangement provides the fourfold output voltage (double excitation voltage plus double measuring voltage) which already considerably reduces the parasitic position-dependency of the displaceable measuring head 110.

Figure 3:
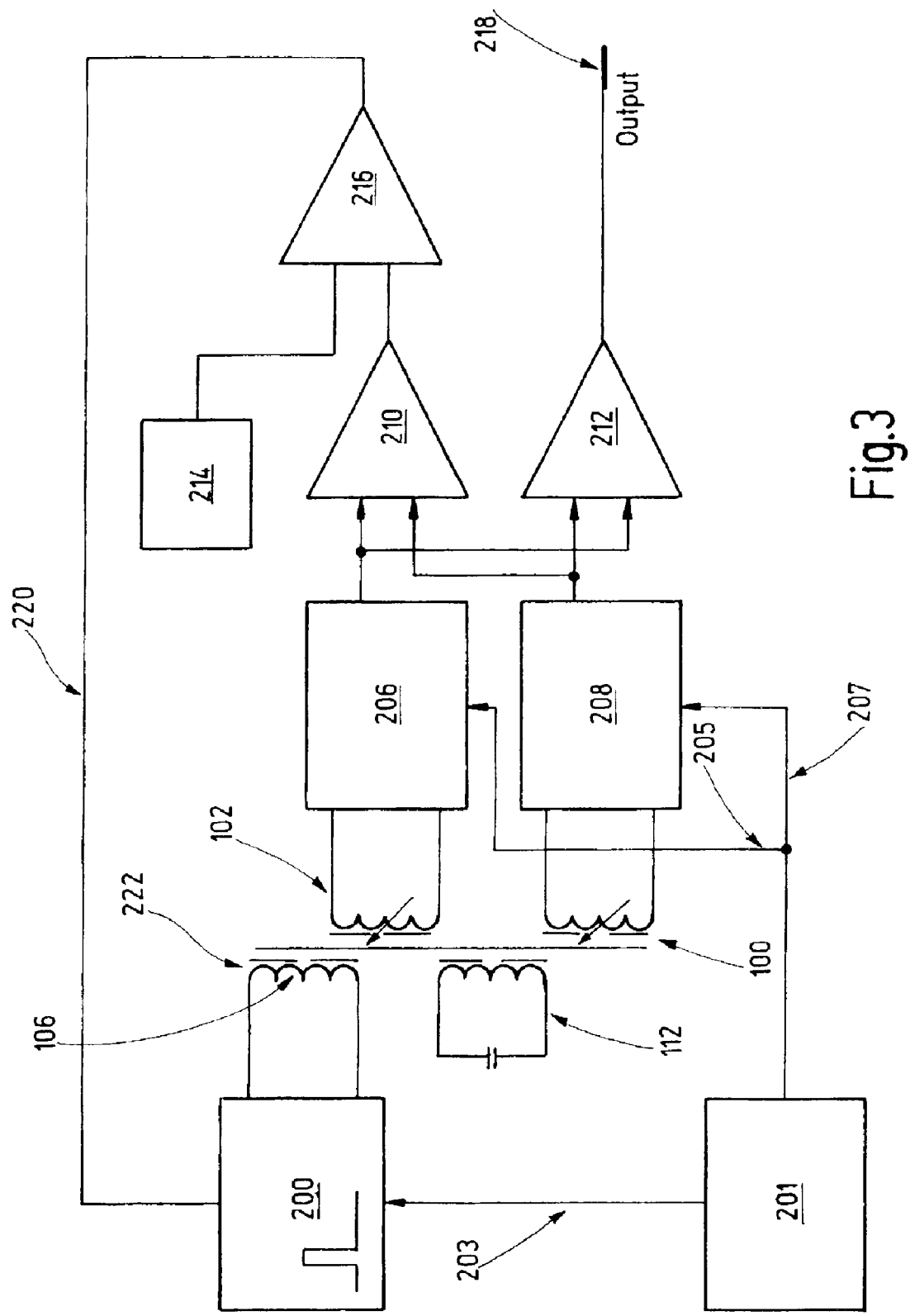
FIG. 3 shows a block diagram of a preferred embodiment of a circuit arrangement for operation of the displacement sensor illustrated in FIG. 2.

FIG. 3 shows one embodiment of a circuit arrangement for operation of the displacement sensor illustrated in FIG. 2 and for evaluation of the measuring signal. A logic module 201 controls on the one hand, via a control line 203, an excitation generator 200, which serves to generate an excitation pulse, and on the other hand, via control lines 205, 207, a synchronous rectifier 206, 208. The rectangular excitation loop 106 illustrated in FIG. 2 is connected to the output of the excitation generator 200. The V-shaped measuring loops 100 and 102 illustrated in FIG. 2 are connected to the inputs of the two identically configured synchronous rectifiers 206, 208.

Figure 4:
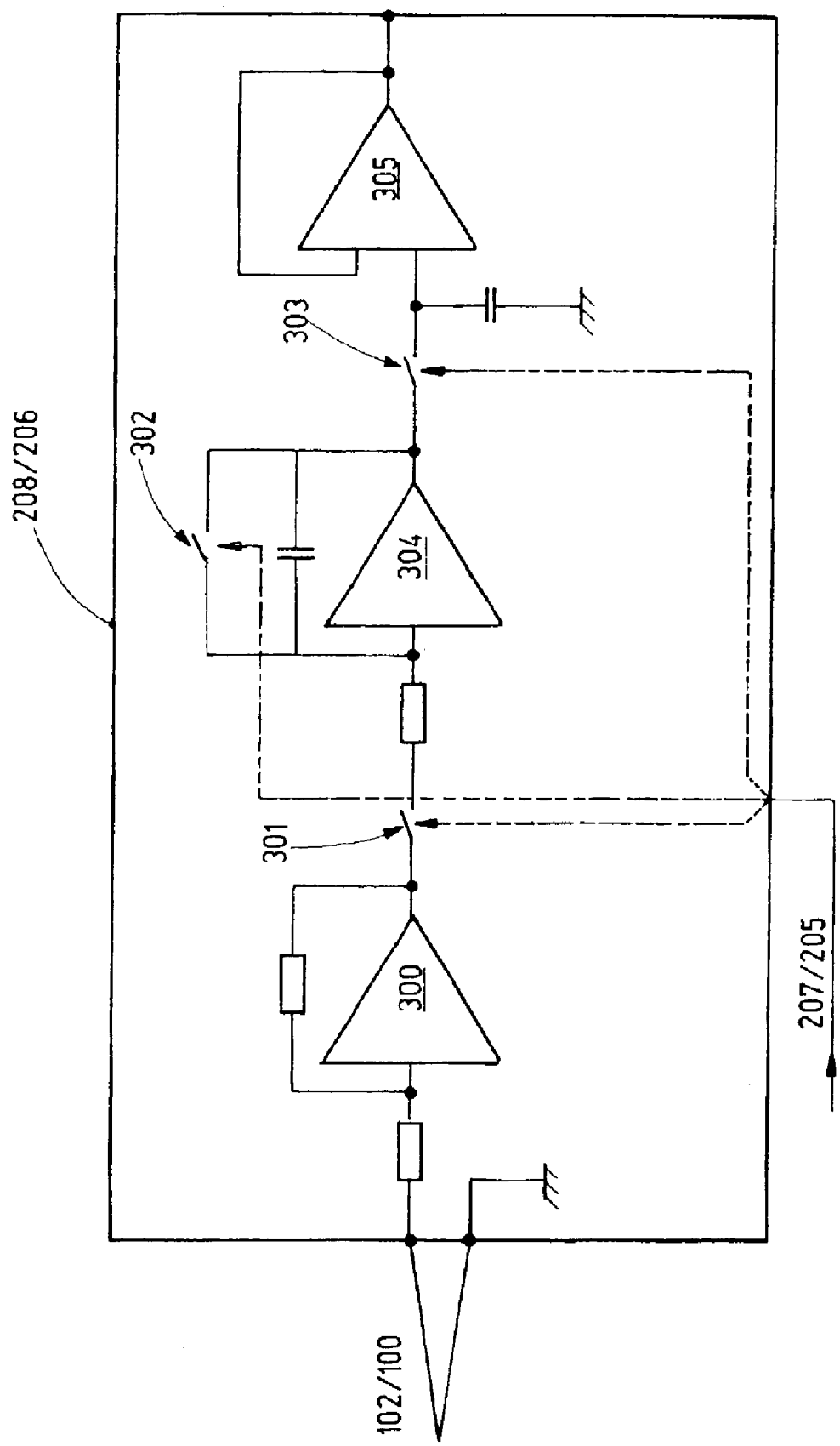
FIG. 4 shows a schematic circuit diagram of one embodiment of the synchronous rectifier illustrated in FIG. 3.
Figure 5:
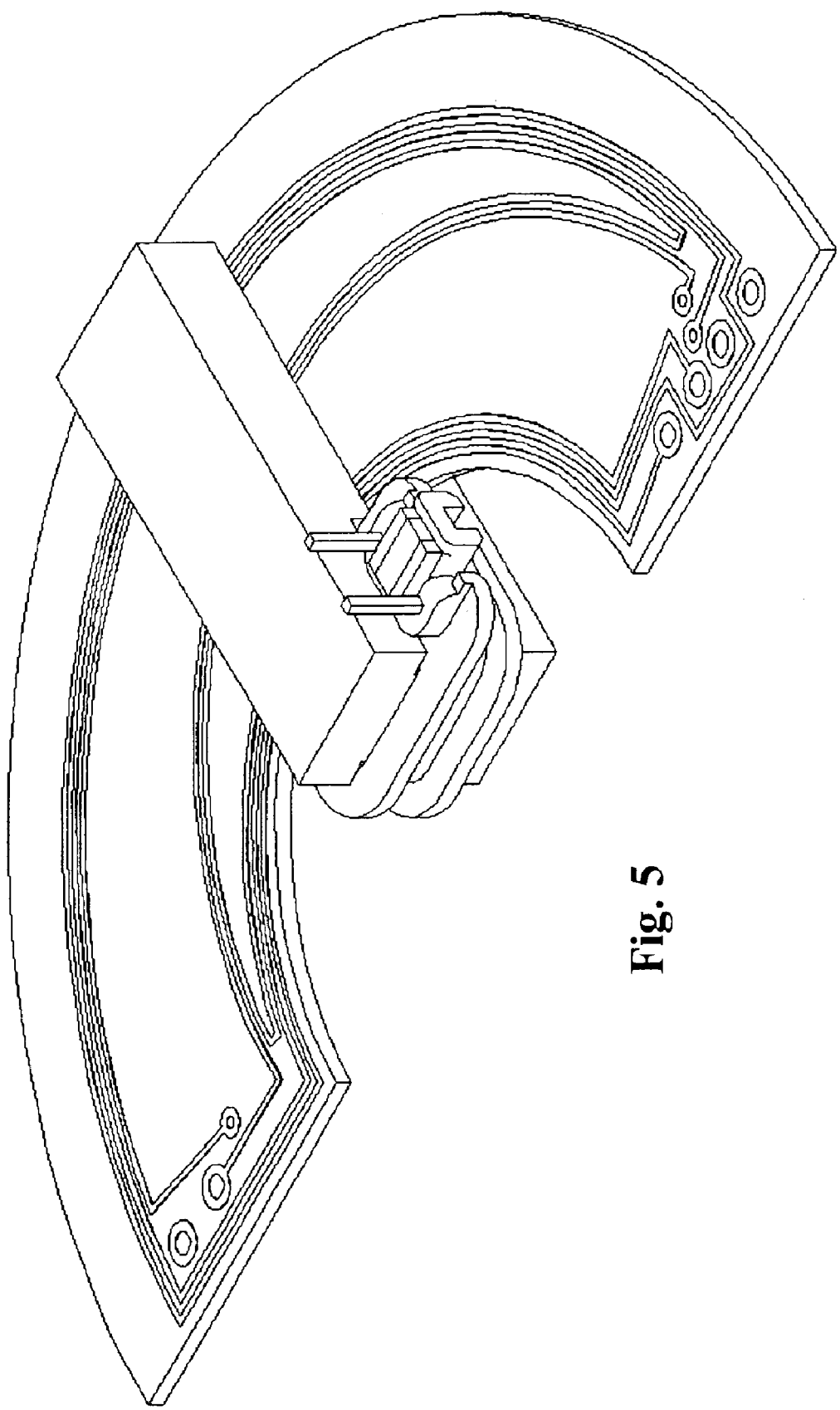
FIG. 5 shows a perspective view of a displacement sensor with a rotatable measuring head.

The inner circuit arrangement of the illustrated synchronous rectifier unit 206, 208 is shown in FIG. 4. The unit 206, 208 comprises a preamplifier 300 and electronic switches 301, 302 and 303. Further, the unit 206, 208 comprises an integrator 304 and a sample&hold circuit 305.

At the beginning of a measuring cycle, the excitation generator 200 sends a short pulse to the excitation loop 106 thereby exciting the resonant circuit 112 (FIG. 2). As long as the excitation pulse is applied, the switches 301 and 303 illustrated in FIG. 4 remain open, while the switch 302 is closed. The voltage signal induced during that period of time in the measuring loops 100, 102 is not transmitted by the preamplifier 300. Once the excitation pulse has died down, sinusoidal voltages are induced in the measuring loops 100 and 102 via the resonant circuit 112. The switch 301 is now opened in correct phase relation, for one half-wave of the first approximately eight sinusoidal oscillations at a time, and the signal present at the output of the preamplifier 300 is integrated by means of the integrator 304.

At the end of the measuring cycle, the switch 303 is closed shortly, and the before-mentioned integrated signal value is transmitted to the sample&hold circuit 305. Thereafter, the integration capacitor of the integrator 304 is discharged via the switch 302, whereby the circuit is initiated for the next measuring cycle. The oscillating circuit 112 is then again excited in correct phase relation by a short excitation pulse, whereby the measuring cycle is re-started.

The output signals of the two synchronous rectifier units 206, 208 are added or summed up by an operational amplifier 210, or are subtracted one from the other by an operational amplifier 212. Given the fact that the arithmetic sum of the voltage induced in the two oppositely directed V-shaped measuring loops 100, 102 remains constant, irrespective of the position of the measuring head 110 along the carrier substrate 104—the geometric sum of the inner surfaces of the measuring loops being equal at any point of the displacement path of the measuring head 110, due to the opposite direction of the measuring loops 100, 102—the arithmetic sum can be used as reference output (reference voltage).

The reference voltage is then compared with a stable voltage source 214 via a PI controller, for example an amplifier 216. Using the differential voltage, the excitation generator 200 then regulates the before-mentioned arithmetic sum so as to keep it on a constant amplitude. Thus, the value of the measuring signal and, consequently, the position-dependent output voltage 218 of the output amplifier 212, derived by subtraction, remain constant regardless of the temperature of the displacement sensor and the before-mentioned electronic components and regardless of any mechanical influences and voltage variations.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. An inductive displacement sensor, comprising: a displaceable or rotatable, magnetically permeable measuring head; at least one measuring loop having a geometric shape that varies in response to longitudinal/rotary displacement of the measuring head; at least one excitation loop by which a magnetic flux is generated in the measuring head, which flux penetrates the at least one measuring loop at any point of the longitudinal/rotary displacement, essentially in a region of the measuring head, and induces an electric measuring signal (i2); and a resonant circuit, which is electrically decoupled from outside is arranged on the measuring head and is excitable in correct phase relation by a short voltage pulse, after a number of free oscillations.

2. The displacement sensor as defined in claim 1, wherein evaluation of the measuring signal (i2) is effected after the voltage pulse has died down in order to avoid any air-coupled induction that may influence the measuring signal.

3. The displacement sensor as defined in claim 1, wherein the number of free oscillations is 10 to 20.

4. The displacement sensor as defined in claim 1, wherein the resonant circuit comprises at least one conductor loop on each of two sides of the at least one measuring loop and the at least one excitation loop.

5. The displacement sensor as defined in claim 4, wherein the resonant circuit comprises two conductor loops on each of the two sides of the at least one measuring loop and the at least one excitation loop.

6. The displacement sensor as defined in claim 1, and further comprising an external control and evaluation circuit connected to the resonant circuit as well as the at least one measuring loop and the at least one excitation loop, the external control and evaluation circuit including an integrater and a phase-controlled switch by means of which first half-waves of a common polarity of a signal, which is coupled into the at least one measuring loop by the resonant circuit, are supplied to the integrator.

7. The displacement sensor as defined in claim 6, wherein the phase-controlled switch is operative to supply the first 5 to 10 half-waves to the integrater.

8. The displacement sensor as defined in claim 6, and further comprising a sample&hold circuit in which the signals integrated by the integrator are stored intermediately.

9. The displacement sensor as defined in claim 6, wherein the evaluation circuit is operative to evaluate the measuring signals by in-phase rectification of a first few amplitudes of oscillation.

10. The displacement sensor as defined in claim 9, wherein the measuring signals are evaluated by in-phase rectification of the second to eighth amplitudes of oscillation.

11. The displacement sensor as defined in claim 6, wherein the control and evaluation circuit has an output valve with an updating frequency in a range of 1 to 10 kHz.

12. The displacement sensor as defined in claim 11, wherein the updating frequency is 5 kHz.

13. The displacement sensor as defined in claim 6, wherein two measuring loops are arranged in opposite direction along the distance of displacement of the measuring head and vary as a function of the displacement.

14. The displacement sensor as defined in claim 13, wherein the measuring loops are v-shaped.

15. The displacement sensor as defined in claim 13, wherein the external control and evaluation circuit comprises a logic adder by which a sum of output voltages of the two measuring loops is supplied as a reference value, as well as a logic subtractor by which an output signal is supplied.

16. The displacement sensor as defined in claim 15, and further comprising a voltage source and a PI regulator, the output signal of the logic adder being compared with a reference value supplied by the voltage source and acting to keep the voltage pulse at a constant level by means of the PI regulator.

* * * * *